United States Patent Office 2,985,027
Patented May 23, 1961

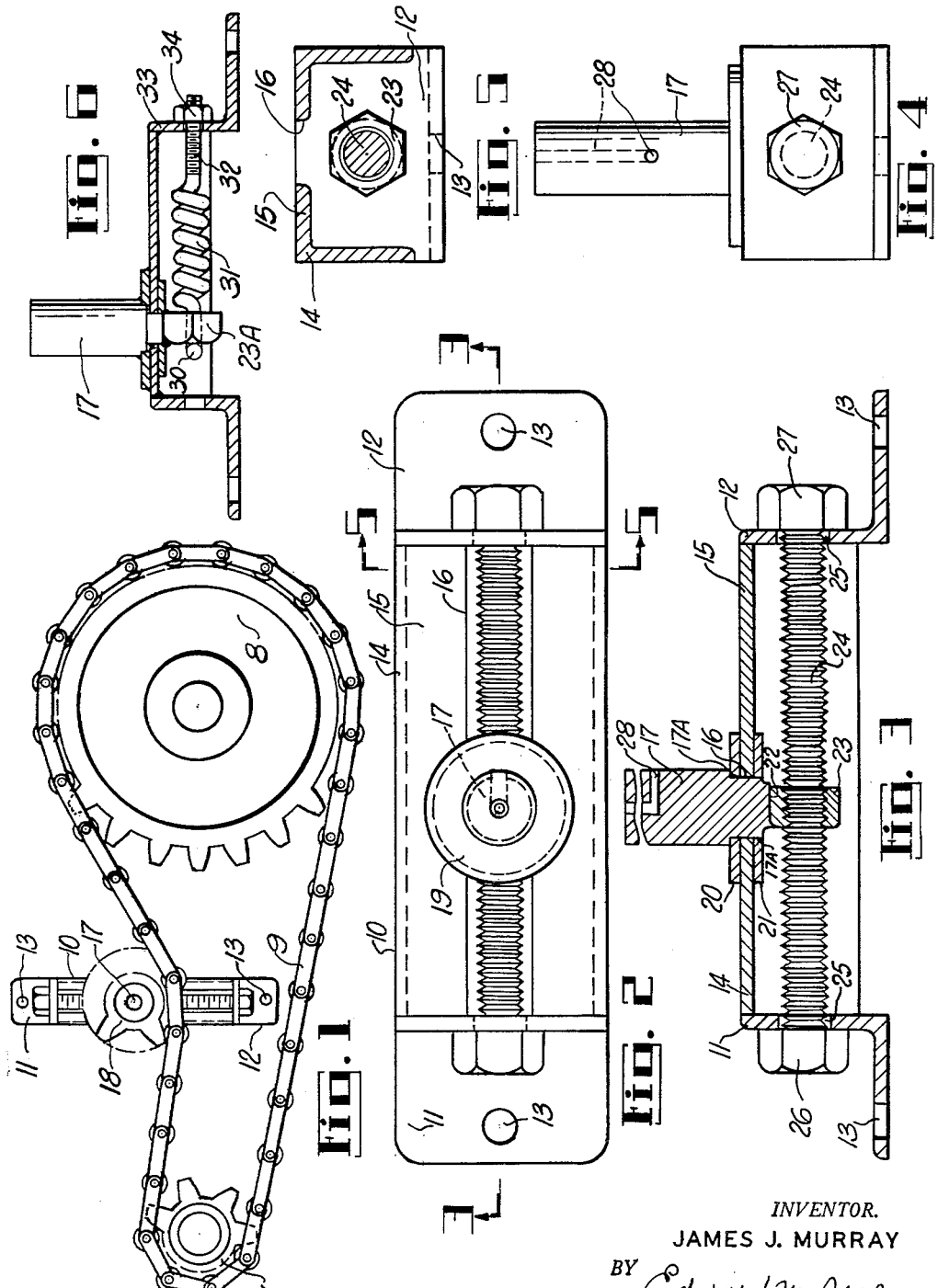

2,985,027

SLACK ADJUSTER

James J. Murray, 14011 Oakland Ave., Detroit, Mich.

Filed Nov. 28, 1958, Ser. No. 777,104

2 Claims. (Cl. 74—242.1)

This invention relates to power transfer devices and has particular reference to a device for adjusting the slack in a chain drive, or belt drive, and the like.

An object of the invention is to generally improve devices of the character indicated, and to provide a slack adjuster which is simple in construction, economical to manufacture, and efficient in operation.

Another object of the invention is to provide a device of the character indicated, which may readily be attached to a chain, or belt, driven machine, and be made applicable to such machine, by the simple expedient of installing an idler sprocket, or a sheave, on a dead shaft, or spindle, which is mounted for vertical, or lateral, adjustment as the machine requires.

Another object of the invention is to provide a slack adjuster which is constructed with a minimum number of moving parts and one which may be assembled, without special tools, from conventional pieces of stock material, and without the necessity of making special castings or forgings or the like.

Another object of the invention is to provide a slack adjuster for a power drive, which can be finely adjusted for maximum results, while the drive is in operation.

The foregoing and other objects and advantages of the invention will become more apparent as the description proceeds, reference being made from time to time to the accompanying drawings, forming part of the within disclosure, in which drawings:

Fig. 1 is a side elevational view of a chain drive, to which is applied a device embodying the invention.

Fig. 2 is a top plan view of a device embodying the invention.

Fig. 3 is a section taken substantially on the line 3—3 of Fig. 2.

Fig. 4 is a right end view of the device shown in Fig. 3.

Fig. 5 is a section taken substantially on the line 5—5 of Fig. 2.

Fig. 6 is a modified form of the device shown in Fig. 2, in which tension on the slack adjustment, is made automatic by means of a spring.

Referring now more particularly to the drawings, it will be understood that in the embodiment herein disclosed, the reference character 7 indicates a drive sprocket, the reference character 8 indicates a driven sprocket, and the reference character 9 indicates the drive chain of a conventional power transfer mechanism. These elements constitute no part of the invention except as they are combined with the elements which are hereinafter described.

The invention resides in the slack adjusting mechanism which I will now describe. The adjusting mechanism consists of a bracket 10 having angular end members 11 and 12, which are provided with holes 13 for receiving bolts, or machine screws, or other suitable means, whereby the bracket 10 may be secured to the frame of the machine, (not shown), of which the sprockets 7 and 8 and the chain 9, are parts thereof. The end members 11 and 12 are welded, or otherwise secured, to the respective ends of an inverted channel member 14, Fig. 5. The web 15 of which is slotted as at 16, to receive one end of a dead shaft 17, on which is mounted for rotation an idler sprocket 18, (Fig. 1), or on which may be mounted an idler pulley 19, (Fig. 2), if the device is to be used to adjust the slack in a belt driven, instead of a chain driven, mechanism, as shown in Fig. 2. The shaft 17, (Fig. 3), is provided above and below the web 15, of the angular member 14, with comparatively large washers 20 and 21, which are secured to the shaft 17 by welding, as at 17A, or other suitable means. The washers 20 and 21 have sufficient clearance to permit the shaft 17 to be adjusted longitudinally in the slot 16 of the bracket 10, but will hold the shaft 17 at substantially right angles to the bracket 10 during all positions of adjustment.

Secured by welding, or other suitable means, to the end of the dead shaft 17, as at 22, is a nut 23, which is arranged to receive the threaded rod 24, which extends through, and is free to rotate in, the openings 25 formed in the end members 11 and 12. Nuts 26 and 27 are welded at either end to the threaded rod 24, so that the rod may be rotated by means of a conventional wrench. The rotation of the rod 24 in one direction causes the nut 23 and the shaft 17 to move toward one end of the bracket 10. Rotation of the rod 24 in the opposite direction causes the nut 23 and the shaft 17 to move in the opposite direction on the bracket 10. The movement of the shaft 17 carries with it the idler sprocket 18, or the pulley 19, (Fig. 2), to effect the adjustment of the slack in the drive chain 9, or the drive belt, (not shown), for the purposes intended. The shaft 17 is preferably drilled, as at 28, so that the sprocket 18 or idler pulley 19 may be lubricated.

In Fig. 6 I show a modification of the device in which a different type of nut 23A is secured to the end of the shaft 17, but instead of a threaded rod extending through the nut 23A, I extend through the nut 23A the end 30 of a tension spring 31, which has a threaded portion 32 formed thereon, which threaded portion 32 extends through an opening in the end member 33, and is received by the nut 34. In this modification, the slack on the drive chain, or belt, is taken up by the tension of the spring 31, which holds the idler against the drive chain. The tension of the spring 31 may be adjusted by the adjustment of the nut 34. In other respects the device functions as previously described.

It is believed that the operation of the device is obvious from the foregoing description.

Having described my invention, what I claim and desire to secure by Letters Patent is:

1. A slack adjuster for a chain driven machine comprising an inverted channel shaped member, a longitudinal slot in the web of said channel, angular end members for closing the ends of said channel, and providing supporting feet for said channel member, means associated with said feet for securing said channel to said machine, a dead shaft having one end slidable in said slot, and having an idler rotatable thereon, means to stabilize said shaft in said slot, a nut secured to the end of said shaft, and a threaded rod rotatably supported in an opening formed in at least one of said angular end members, said rod being in threaded engagement with said nut.

2. A slack adjuster for a chain driven machine comprising an inverted channel shaped member, a longitudinal slot in the web of said channel, angular end members for closing the ends of said channel, and providing supporting feet for said channel member, means associated with said feet for securing said channel to said machine, a dead shaft having one end slidable in said slot, and having an idler rotatable on the other end, means to stabilize said dead shaft in said slot, a nut secured to the end of said shaft in said channel, a tension spring having one end secured to said nut, said spring having a threaded area extending through an opening in one of said end closure members, and a nut on said threaded area for adjusting the tension on said spring and dead shaft.

References Cited in the file of this patent

UNITED STATES PATENTS

| | | |
|---|---|---|
| 458,186 | Piers | Aug. 25, 1891 |
| 1,426,301 | Leoni | Aug. 15, 1922 |
| 1,503,500 | Heintz | Aug. 5, 1924 |
| 1,606,010 | Wilbrot | Nov. 9, 1926 |
| 1,641,753 | Gerke | Sept. 6, 1927 |
| 1,674,817 | Best | June 26, 1928 |
| 2,121,080 | Galkin | June 21, 1938 |
| 2,257,305 | Nickerson | Sept. 30, 1941 |
| 2,752,798 | Swavely | July 3, 1956 |